(12) United States Patent
Waterman

(10) Patent No.: US 11,928,476 B2
(45) Date of Patent: *Mar. 12, 2024

(54) VIRTUALIZED TRANSACTION TERMINAL PLATFORM

(71) Applicant: NCR Voyix Corporation, Atlanta, GA (US)

(72) Inventor: Simon Waterman, Somerset (GB)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,466

(22) Filed: Mar. 21, 2022

(65) Prior Publication Data

US 2022/0206824 A1 Jun. 30, 2022

Related U.S. Application Data

(63) Continuation of application No. 16/848,207, filed on Apr. 14, 2020, now Pat. No. 11,294,693.

(51) Int. Cl.
*G06F 9/4401* (2018.01)
*G06F 13/40* (2006.01)
*G06Q 20/20* (2012.01)

(52) U.S. Cl.
CPC ........ *G06F 9/4411* (2013.01); *G06F 13/4072* (2013.01); *G06F 13/409* (2013.01); *G06Q 20/202* (2013.01)

(58) Field of Classification Search
CPC .. G06F 9/4411; G06F 13/4072; G06F 13/409; G06Q 20/202

USPC ............................................................. 713/2
See application file for complete search history.

(56) References Cited

U.S. PATENT DOCUMENTS

| | | | | |
|---|---|---|---|---|
| 5,027,282 A * | 6/1991 | Hollidge | ............... | G07F 13/025 705/413 |
| 5,548,759 A * | 8/1996 | Lipe | .......................... | G06F 8/54 |
| 5,659,800 A * | 8/1997 | Zhang | .................... | G06F 3/0227 710/36 |
| 6,311,165 B1 * | 10/2001 | Coutts | ................ | G06Q 20/1085 710/1 |
| 6,760,784 B1 * | 7/2004 | Bodin | ................... | G06F 9/4411 345/593 |

(Continued)

*Primary Examiner* — Paul R. Myers
(74) *Attorney, Agent, or Firm* — Schwegman Lundberg & Woessner, P.A.

(57) ABSTRACT

A virtualized transaction terminal platform is provided. A transaction terminal is configured as a thin-client terminal. A virtualized transaction terminal (Virtual Machine (VM)) is instantiated remotely on a cloud or a server over a network connection. Peripherals connected to the thin-client terminal are mapped to virtual peripheral device drivers on the cloud or the server. Physical peripherals connected to the thin-client terminal are mapped inside the VM to the corresponding virtual peripheral device drivers. As transactions are initiated and physical peripherals are operated at the thin-client terminal, the transactions are processed by the VM and inputs/outputs from the physical peripherals are forwarded for processing by the corresponding virtual peripheral device drivers. A remote desktop (RD) agent on the thin-client terminal keeps states of the VM and virtual peripheral device drivers in synchronization with a peripheral display of the thin-client terminal.

20 Claims, 4 Drawing Sheets

(56) References Cited

U.S. PATENT DOCUMENTS

| | | | | |
|---|---|---|---|---|
| 8,112,505 B1* | 2/2012 | Ben-Shaul | G06F 16/1767 | 709/219 |
| 8,539,137 B1* | 9/2013 | Protassov | G06F 3/0659 | 711/6 |
| 9,037,491 B1* | 5/2015 | Lee | G06Q 20/34 | 705/17 |
| 11,294,693 B2* | 4/2022 | Waterman | G06Q 20/322 | |
| 2004/0098604 A1* | 5/2004 | Noldge | G06F 21/73 | 713/193 |
| 2004/0128201 A1* | 7/2004 | Ofir | G07F 19/211 | 705/17 |
| 2007/0174429 A1* | 7/2007 | Mazzaferri | H04L 63/102 | 709/218 |
| 2007/0276763 A1* | 11/2007 | Kleinman | G06Q 20/202 | 705/64 |
| 2010/0107155 A1* | 4/2010 | Banerjee | G06F 8/60 | 717/177 |
| 2011/0022812 A1* | 1/2011 | van der Linden | H04L 67/1097 | 711/E12.001 |
| 2011/0087602 A1* | 4/2011 | Rutman | H04L 12/66 | 379/93.12 |
| 2011/0087726 A1* | 4/2011 | Shim | G06F 9/5072 | 709/245 |
| 2012/0197744 A1* | 8/2012 | Rose | G06Q 20/202 | 705/17 |
| 2012/0254862 A1* | 10/2012 | Dong | G06F 9/4411 | 718/1 |
| 2014/0019542 A1* | 1/2014 | Rao | G06Q 30/0269 | 709/204 |
| 2014/0025942 A1* | 1/2014 | Nakazima | G06F 9/4408 | 713/1 |
| 2014/0046788 A1* | 2/2014 | Lee | G06Q 20/36 | 705/21 |
| 2014/0149191 A1* | 5/2014 | Aguayo | G06Q 30/0611 | 705/14.1 |
| 2016/0155107 A1* | 6/2016 | Haijji | G06Q 20/34 | 705/17 |
| 2016/0179565 A1* | 6/2016 | Chen | H04L 67/08 | 718/1 |
| 2016/0224959 A1* | 8/2016 | Oishi | G06Q 20/3224 | |
| 2016/0232512 A1* | 8/2016 | Ueno | G06Q 20/209 | |
| 2016/0323380 A1* | 11/2016 | Tsutsumi | H04L 67/1095 | |
| 2017/0024339 A1* | 1/2017 | Watanabe | G06F 21/73 | |
| 2017/0308878 A1* | 10/2017 | Yang | G06Q 20/123 | |
| 2017/0351877 A1* | 12/2017 | Knapp | H04L 63/145 | |
| 2018/0131635 A1* | 5/2018 | Sardaryan | H04L 67/10 | |
| 2018/0211238 A1* | 7/2018 | Ishikawa | G06Q 20/209 | |
| 2019/0034902 A1* | 1/2019 | Bukovics | G06F 13/10 | |
| 2019/0116095 A1* | 4/2019 | Huang | H04L 41/32 | |
| 2020/0358870 A1* | 11/2020 | Flynn | H04L 67/75 | |
| 2021/0110440 A1* | 4/2021 | Dion | G06Q 30/0278 | |

* cited by examiner

VIRTUALIZED TRANSACTION TERMINAL PLATFORM

CROSS-REFERENCE TO RELATED APPLICATION

This application is a continuation of U.S. patent application Ser. No. 16/848,207, filed Apr. 14, 2020, which application and publication is incorporated herein by reference in its entirety.

BACKGROUND

Modern virtualized environments provide support for standard and typical thin client peripheral devices, such as keyboard, display, mouse, and other Universal Serial Bus (USB) peripherals.

However, most Point-Of-Sale (POS) terminals and Self-Service Terminals (SSTs) include a variety of industry specific and non-standard peripheral devices, such as General-Purpose Input/Output (GPIO) peripherals, serial interface peripherals, Peripheral Component Interconnect (PCI) peripherals, non-standard or legacy USB peripherals, Bluetooth® peripherals, Inter-Integrated Circuit/System Management Bus (I2C/SMBus) peripherals, and other wireless peripherals.

These existing legacy requirements of many enterprises with respect to their POS terminals/SSTs make providing terminal virtualization difficult to achieve. Moreover, POS terminals/SSTs require a wide range of different peripherals (item code scanners, touch displays, contact-based card readers, contactless card readers, Near Field Communication (NFC) readers, Personal Identification Number (PIN) pads, keyboards, mice, security cameras, cash drawers, cash and coin dispensers, cash and coin accepters, check readers/scanners, weigh scales, and others). Each enterprise spends significant resources to obtain and integrate its needed peripherals.

Many times, peripherals desired may be unavailable for use because the underlying terminal Operating System (OS) is unable to support (incompatible with) the driver associated with the desired peripheral or the version number of the OS is unable to support the desired peripheral. Additionally, when an OS vendor upgrades an OS, some of the enterprises existing peripheral drivers may no longer be supported and may require replacement. Still further, vendors of the peripherals may stop supporting later versions of drivers associated with the peripherals in an effort to move enterprises to newer peripherals. When this occurs, the enterprises are often forced to undergo costly and timely capital purchases and resource time, which are needed to perform the upgrades.

As a result, enterprises are largely forced to continuously replace and upgrade peripherals and OSs for their POS terminals and SSTs. Virtualization has largely not been a viable or practical solution due to the variety of needed terminal peripherals. In fact, many of the legacy motherboards on the POS terminals and SSTs lack a needed number of peripheral port connections for newer USB-based peripherals and some of the legacy peripheral ports that are available are no longer available on newer motherboards of newer POS terminals and SSTs, such that any enterprise that upgrades to newer POS terminals or SSTs (with new motherboards) often have to also upgrade to newer USB-based peripherals.

SUMMARY

In various embodiments, methods and a system for a virtualized transaction terminal platform are presented.

According to an aspect, a method for operating a virtualized transaction terminal platform is presented. Specifically, an instance of a virtual transaction terminal is initiated based on a boot of a transaction terminal with a thin-client Operating System (OS). Types of peripherals that are connected to the transaction terminal are identified. Each type of peripheral is mapped to a virtual peripheral device driver within the virtual transaction terminal. Transaction are processed through the virtual transaction terminal by processing output received from the peripherals within the virtual transaction terminal and by producing instructions for the peripherals from the virtual peripheral device drivers and forwarding the instructions to the peripherals during the transactions for processing by the peripherals. A synchronization of transaction states and transaction display information is maintained between the virtual transaction terminal, the peripherals, the virtual peripheral device drivers, and at least one peripheral display of the transaction terminal.

DETAILED DESCRIPTION

Figure 1:
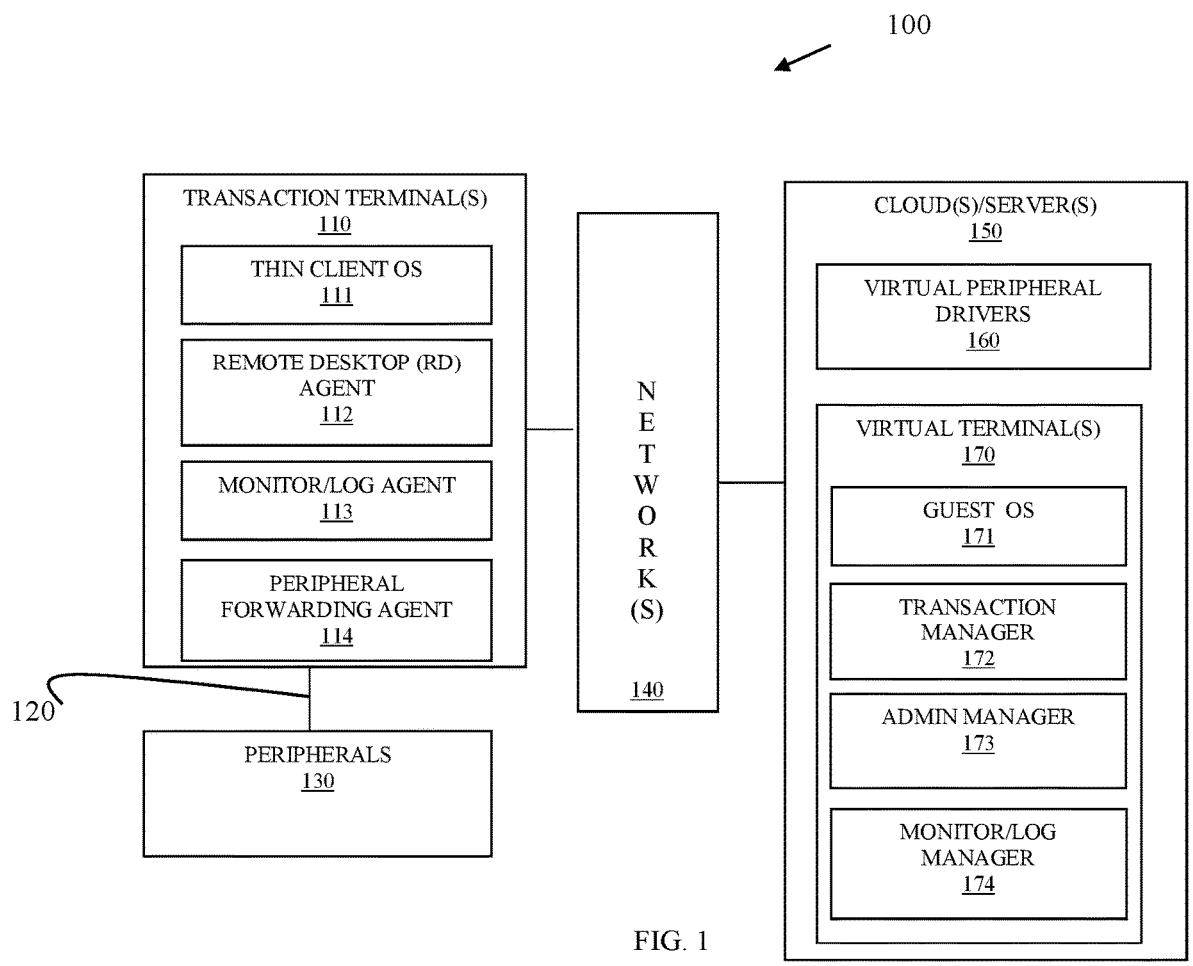
FIG. 1 is a diagram of a system for a virtualized transaction terminal platform, according to an example embodiment.

FIG. 1 is a diagram of a system 100 for a virtualized transaction terminal platform, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of providing and operating a virtualized transaction terminal platform presented herein and below.

The system 100 provides a transaction terminal virtualization platform by which legacy and existing transaction terminals along with their existing peripherals supported by terminals' motherboards are configured as thin clients where the peripheral drivers and transaction software are processed in virtualized environments, which is external and remote from the thin client transaction terminals. A variety of peripherals are supported including, by way of example only, GPIO peripherals, serial peripherals, wireless peripherals, PCI peripherals, standard and non-standard USB peripherals, and others.

The system 100 includes: transaction terminals 110, peripherals 130, a variety of network connections 140, and one or more cloud processing environments (clouds) or servers 150.

Each transaction terminal 110 includes a processor and a non-transitory computer-readable storage medium having executable instructions representing a thin client OS 111, a remote desktop (RD) agent 112, a monitor/log agent 113, and a peripheral forwarding agent 114. The executable instructions when executed by the corresponding processor of the corresponding terminal 110 from the corresponding non-transitory computer-readable storage environment cause the corresponding processor to perform processing discussed below herein and below as thin client OS 111, RD agent 112, monitor/log agent 113, and peripheral forwarding agent 114.

Each cloud/server 150 includes at least one processor and a non-transitory computer-readable storage medium having executable instructions representing virtual peripheral drivers 160 and virtual terminals 170 (virtual machine (VM 170)). Each VM 170 utilizing at least one hardware processor and non-transitory computer-readable storage medium having executable instructions representing a guest OS 171, transaction manager 172, an administrative (admin) manager 173, and a monitor/log manager 174. The corresponding executable instructions when executed by the corresponding processor from the corresponding non-transitory computer-readable storage medium cause the corresponding processor to perform processing discussed herein and below as virtual peripheral drivers 160, VM 170, guest OS 171, transaction manager 172, administrative (admin) manager 173, and monitor/log manager 174.

Initially, each terminal 110 is configured as a thin client and booted with thin client OS 111. Thin client OS 111 then loads and initiates RD agent 112, monitor/log agent 113, and peripheral forwarding agent 114. The thin client Basic Input Output System (BIOS) is changed to perform a network boot from a remote network location to load and initiate thin client OS 111. Discovered peripherals 130 and their initialization messages are trapped by peripheral forwarding agent 114 and forwarded over network connection 140 to guest OS 171. Guest OS 171 initiates the appropriate virtual peripheral drivers 160 corresponding to peripherals 130 that reported during the boot of terminal 110.

When thin client OS 111 loads on a terminal 110, a hypervisor on cloud/server 150 loads, initiates, and manages an VM (virtual transaction terminal) 170 that corresponds with terminal 110. Guest OS 171 then receives initialization messages reported by peripherals 130 from peripheral forwarding agent 114 and maps within VM 170 corresponding virtual peripheral drivers 160 within the address space of VM 170.

RD agent 112 is a thin client agent that provides a RD protocol for purposes of trapping input events and forwarding the input events to the corresponding VM 170. RD agent 112 also ensures that output received, and a state associated with processing virtual peripheral driver 160, transaction manager 172, admin manager 173, and monitor/log manager 174 are properly displayed on a display (a type of peripheral 130) during operation of thin client transaction terminal 110.

During operation of a given terminal 110, interface screens are presented on a display peripheral 130 as generated by transaction manager 172, admin manager 173, and monitor/log manager 174 from within the corresponding VM 170, which is physically executing on cloud/server 150 over network 140. Interface inputs are captured via the peripherals 130 connected to the motherboard of terminal 110 and forwarded through peripheral forwarding agent 114 over network 140 to guest OS 171. The input messages are mapped to the corresponding virtual peripheral driver 160 and provided by the guest OS 170 to that virtual peripheral driver 160. Output directed from the virtual peripheral driver 160 is provided to guest OS 171 and forwarded to thin client OS 111. It may be that transaction manager 172 generated a command to cause a peripheral 130 to perform some operation (such as open a cash drawer peripheral 130), so transaction manager 172 generates and sends the command to the corresponding virtual peripheral driver 160 while processing within guest OS 171, output from virtual peripheral driver 160 is provided to guest OS 171 and forwarded over network 140 to transaction terminal 110 where it is provided to the corresponding peripheral 130 for execution on that peripheral 130.

RD agent 112 ensures events and states between VM 170 and terminal 110 stay synchronized. As a result, terminal 110 and its peripherals 130 (including a display peripheral 130) are synchronized with VM 170 (guest OS 171, which is processing managers 172-174) and its mapped virtual peripheral drivers 160. Terminal 110 and VM 170 (through cloud/server 150) are connected over network 140.

In an embodiment, terminal 110 is a mobile device, such as a phone, a tablet, and a wearable processing device that includes a software application to wireless connect over a wireless network (Bluetooth®, Wi-Fi, etc.) to peripherals 130 and process RD agent 112, monitor/log agent 113, and peripheral forwarding agent 114. In this embodiment, a mobile phone or tablet computer can process as a thin client 111 using the display of the mobile device and human input devices of the mobile device and wireless connect over network 140 to VM 170 of cloud/server 150 and process transaction manager 172 to perform transactions, process admin manager 173 to perform administrative operations, and process monitor/log agent 174 to perform audit and security operations.

Admin manager 173 provides interfaces for performing administrative functions that include configuration of peripherals 130 through virtual peripheral drivers 160, setting metrics to collect for transactions and peripherals 130, setting transaction metrics during performance of transactions with transaction manager 172, setting security and security accounts, and defining reports.

Monitor/Log manager 174 provides interfaces for capturing transaction and peripheral metrics that are processed on terminal 110 in cooperation with the corresponding VM 170. Audition, reporting, and events may be defined through monitor/log manager 174.

In an embodiment, multiple VMs 170 may be instantiated for a single terminal 110. For instance, terminal 110 may be defined as a first VM 170 for which transaction operations are processed at terminal 110 using peripherals 130, simultaneously, a mobile device 110 may be defined as a second VM 170 with the mobile device 110 having access to select peripherals 130 wirelessly, such as scanners, cash drawers, cameras, card readers, etc.

System 100 provides a virtualized transaction terminal platform allowing terminals 110 to serve as thin-clients and all peripherals 130 of a legacy and existing terminal's motherboard to be supported through virtualized peripheral drivers 160. The platform includes a variety of benefits, such as an by way of example only, reduces reliance of legacy and existing terminals on vendor-specific peripherals, extends lifetime of use of legacy peripheral devices, exposes POS/SST applications to new hardware, such as mobile devices, and enables POS/SST to be processes as multi-function devices.

In an embodiment, peripherals 130 connect with terminal 110 over a wireless connection 120.

In an embodiment, peripherals 130 connect with terminal 110 over a wired connection 120.

In an embodiment, wired connection 120 is made over ports of a motherboard on transaction terminal 110 to peripherals 130.

In an embodiment, the ports of terminal 110 include support for one or more peripherals 110 that are associated with: GPIOs, PCIs, USBs, Serial ports, I2C/SMBus ports, non-standard USBs, Bluetooth®, NFC, and/or Wi-Fi.

In an embodiment, terminals 110 are POS terminals, SSTs, Automated Teller Machines (ATMs), and/or kiosks.

In an embodiment, terminals 110 are mobile devices, such as phones, tablets, laptops, and/or a wearable processing device.

In an embodiment, terminals 110 are any combination of phones, tablets, laptops, wearable processing devices, POS terminals, SSTs, ATMs, and/or kiosks.

In embodiment, transaction manager 172 performs processing associated with retail transactions along with the appropriate peripherals 130, such as contact payment card readers, contactless payment card readers, item bar code scanners, currency and/or coin acceptors, currency and/or coin dispensers, cash drawers, touch screen displays, mice, keyboards, LED lights, PIN pads, Encrypted PIN pads, a media depository, and/or a media recycler. In an embodiment, a number of the peripherals 130 permit wireless interaction, such as payment card readers, item bar code scanners, cash drawers, mice, keyboards, and others.

In an embodiment, the admin manager 173 is not resident within the guest OS 171 and the admin manager is responsible for transforming output received from the peripherals 130 into expected information that can be processed by the virtual peripheral drivers 160. In this way, the guest OS 171 does not need to be aware that it is processing with VM 170 and does not need new software to install or process the virtual peripheral drivers 160, which reside external to the VM 170.

In an embodiment, virtual peripheral device drivers 160 can transform output from and input into peripherals 130. The transformation includes altering, adding, or removing messages and adapting between transport or interface technologies. This allows for a camera of a mobile phone to serve as a scanner peripheral 130 for terminal 110 by transforming the input expected by the mobile phone (or tablet, wearable processing device, etc.) and by transforming the output expected by transaction manager 172 from the mobile camera to make the integrated mobile phone appear to transaction manager 172 to be a separate scanner peripheral 130 of terminal 110. So, a bridging or translation can occur between the transport and interface technologies to adapt the mobile camera into a separate scanner 130 recognizable by transaction manager 172 for transaction processing. It is noted that this is but one example as other integrated peripherals of the mobile device can be processed as attached or connected peripherals 130 to the terminal 110 by the virtual peripheral device drivers 160.

In an embodiment, atypical peripherals associated with devices that are not generally considered to be peripherals, such as mobile devices are virtualized as an attached or connected peripheral 130 through the virtualized peripheral device drivers 160 and/or the admin manager 173 by transforming input directed to the atypical peripherals and by transforming output produced by the atypical peripherals. In this way, the platform discussed above can adapt peripherals of one device (such as a mobile device) into a peripheral 130 that is connected to terminal 110).

The above-noted and other embodiments are now discussed with reference to FIGS. 2-4.

Figure 2:
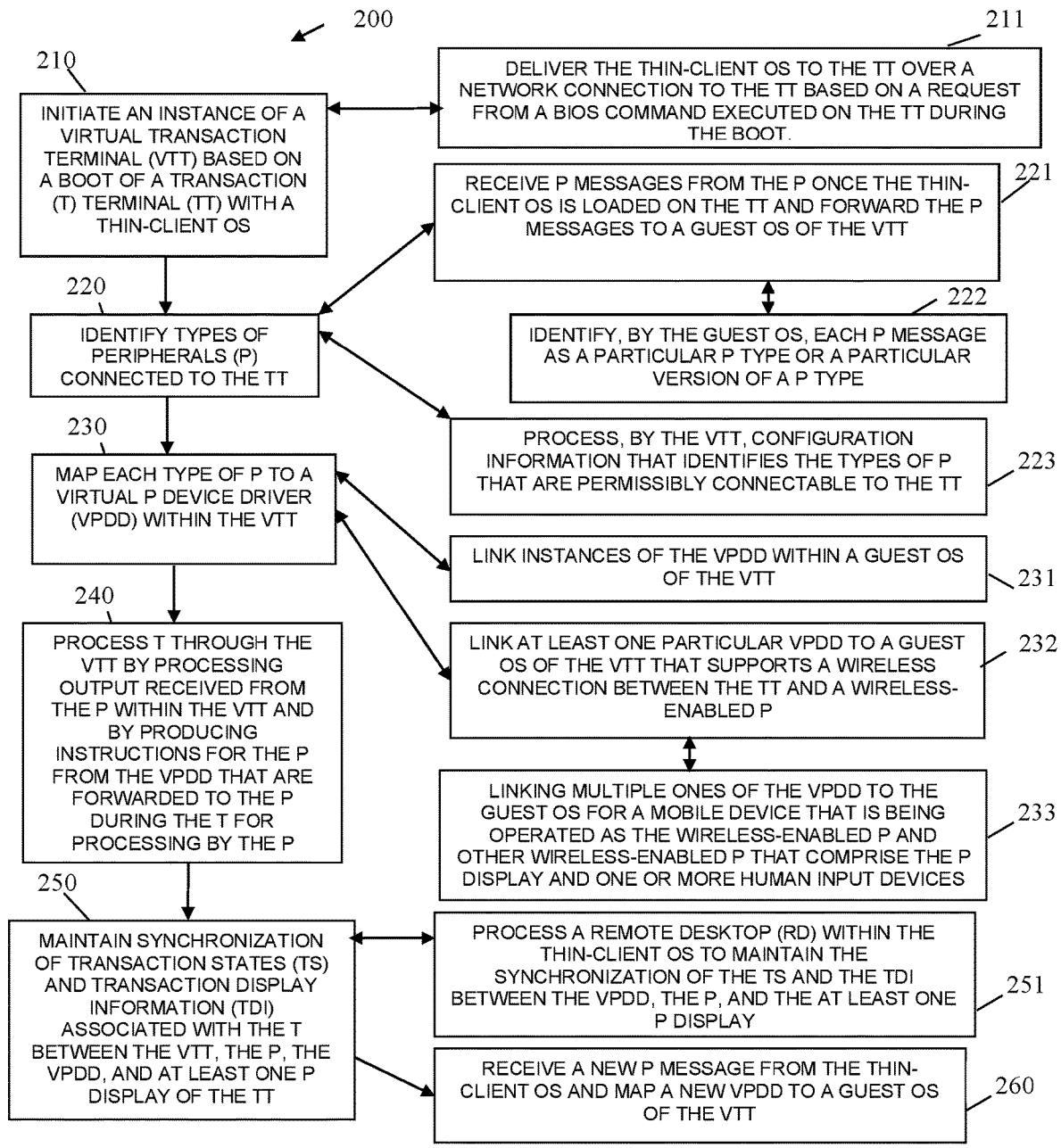
FIG. 2 is a diagram of a method for operating a virtualized transaction terminal platform, according to an example embodiment.

FIG. 2 is a diagram of a method 200 for operating a virtualized transaction terminal platform, according to an example embodiment. The software module(s) that implements the method 200 is referred to as a "virtualized transaction terminal service." The virtualized transaction terminal service is implemented as executable instructions programmed and residing within memory and/or a non-transitory computer-readable (processor-readable) storage medium and executed by one or more processors of a device. The processor(s) of the device that executes the virtualized transaction terminal service are specifically configured and programmed to process the virtualized transaction terminal service. The virtualized transaction terminal service has access to one or more network connections during its processing. The network connections can be wired, wireless, or a combination of wired and wireless.

In an embodiment, the device that executes the virtualized transaction terminal service is cloud(s)/server(s) 150. In an embodiment, the device that executes the virtualized transaction terminal service is one or more cloud processing environments 150. In an embodiment, the device that executes the virtualized transaction terminal service is one or more servers 150.

In an embodiment, the virtualized transaction terminal service is all of or some combination of 160 and 170-174.

At 210, the thin-client transaction terminal service initiates an instance of a virtual transaction terminal based on a boot of a transaction terminal with a thin-client OS.

In an embodiment, at 211, the thin-client transaction terminal service delivers the thin-client OS to the transaction terminal over a network connection to the transaction terminal based on a request from a BIOS command executed on the transaction terminal during the boot.

At 220, the thin-client transaction terminal service identifies types of peripherals connected to the transaction terminal.

In an embodiment, at 221, the thin-client transaction terminal service receives peripheral messages from the peripherals once the thin-client OS is loaded on the transaction terminal and the thin-client transaction terminal service provides the peripheral messages to a guest OS of the instance of the virtual transaction terminal.

In an embodiment of 221 and at 222, the guest OS of the virtual transaction terminal instance identifies each peripheral message as a particular type or a particular version of a peripheral type. The types of peripherals can include any combination of peripherals associated with USB, non-standard USB, NFC, Wi-Fi, GPIO, Serial, and PCI.

In an embodiment, at 223, the virtual transaction terminal instance processes configuration information that identifies the types of peripherals, which are permissibly connectable to the transaction terminal.

At 230, the thin-client transaction terminal service maps each type of peripheral to a virtual peripheral device driver within the instance of the virtual transaction terminal.

In an embodiment, at 231, the thin-client transaction terminal service links instances of the virtual peripheral device drivers within a guest OS of the instance of the virtual transaction terminal.

In an embodiment, at 232, the thin-client transaction terminal service links at least one particular virtual peripheral device driver to a guest OS of the instance of the virtual transaction terminal that supports a wireless connection between the transaction terminal and a wireless-enabled peripheral.

In an embodiment of 232 and at 233, the thin-client transaction terminal service links multiple ones of the virtual peripheral device drivers to the guest OS for a mobile device that is being operated as the wireless-enabled peripheral and other wireless-enabled peripherals that comprise the peripheral display for the transaction terminal and one or more HIDs for the transaction terminal.

At 240, the thin-client transaction terminal service processes transaction through the instance of the virtual transaction terminal by processing output received from the peripherals within the instance of the virtual transaction terminal and by producing instructions for the peripherals from the virtual peripheral device drivers that are forwarded to the peripherals during the transactions for processing by the peripherals.

At 250, the thin-client transaction terminal service maintains synchronization of transaction states and transaction display information associated with the transactions between the instance of the virtual transaction terminal, the peripherals of the transaction terminal, the virtual peripheral device drivers, and at least one peripheral display of the transaction terminal.

In an embodiment, of 251, the thin-client transaction terminal service processes a remote desktop application within the thin-client OS to maintain synchronization of the transaction states and the transaction display information between the virtual peripheral device drivers, the peripherals, and the peripheral display.

According to an embodiment, at 260, the thin-client transaction terminal service receives a new peripheral message from the thin-client OS and maps a new virtual peripheral device driver to a guest OS of the instance of the virtual transaction terminal.

Figure 3:
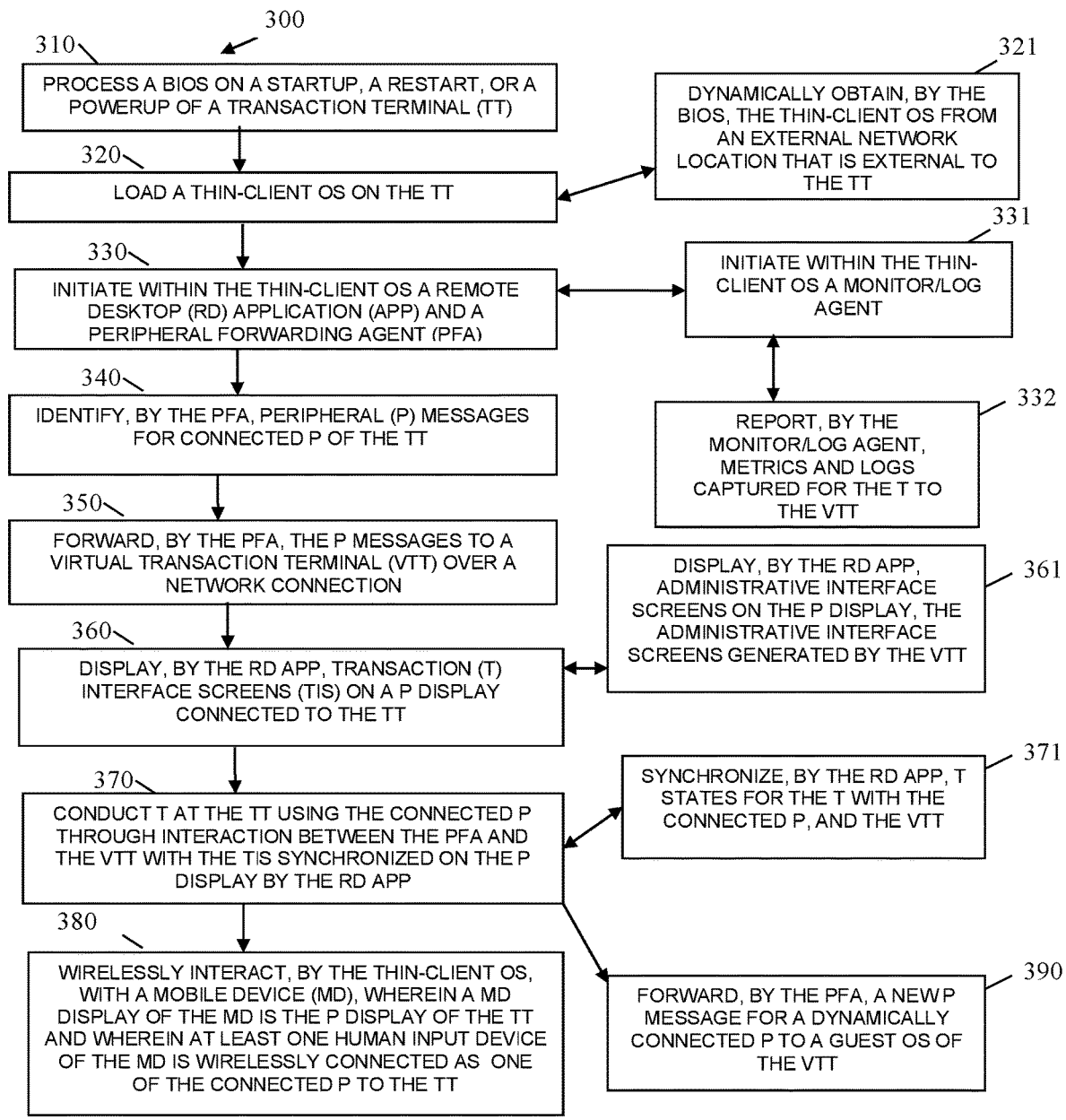
FIG. 3 is a diagram of another method operating a virtualized transaction terminal platform, according to an example embodiment.

FIG. 3 is a diagram of another method 300 for operating a virtualized transaction terminal platform, according to an example embodiment. The software module(s) that implements the method 300 is referred to as a "thin-client transaction terminal service." The thin-client transaction terminal service is implemented as executable instructions programmed and residing within memory and/or a non-transitory computer-readable (processor-readable) storage medium and executed by one or more processors of a device. The processors that execute the thin-client transaction terminal service are specifically configured and programmed to process the thin-client transaction terminal service. The thin-client transaction terminal service has access to one or more network connections during its processing. The network connections can be wired, wireless, or a combination of wired and wireless.

In an embodiment, the device that executes the thin-client transaction terminal service is transaction terminal 110. In an embodiment, transaction terminal 110 is: a POS terminal, a SST, an ATM, a kiosk, a mobile phone, a laptop, a tablet, or a wearable processing device.

In an embodiment, the thin-client transaction terminal service is all or some combination of 110-114.

The thin-client transaction terminal service presents the interaction between terminal 110 and VM 170 and/or method 200.

At 310, the thin-client transaction terminal service processes a BIOS on a startup, a restart, or a powerup of a transaction terminal.

At 320, the thin-client transaction terminal service loads a thin-client OS on the transaction terminal.

In an embodiment, at 321, the BIOS dynamically obtains the thin-client OS from an external network location that is external to the transaction terminal.

At 330, the thin-client transaction terminal service initiates within the thin-client OS a remote desktop application and a peripheral forwarding agent.

In an embodiment, at 331, the thin-client transaction terminal service initiates within the thin-client OS a monitor/log agent.

In an embodiment of 331 and at 332, the monitor/log agent reports metrics and logs captured for the transaction to the virtual transaction terminal.

At 340, the peripheral forwarding agent identifies peripheral message for connected peripherals to the transaction terminal.

At 350, the peripheral forwarding agent forwards peripheral messages to the virtual transaction terminal over a network connection.

At 360, the remote desktop application displays transaction interface screens on a peripheral display connected to the transaction terminal.

In an embodiment, at 361, the remote desktop application displays administrative interface screens on the peripheral display. The administrative interface screens generated by the virtual transaction terminal.

At 370, the thin-client transaction terminal service conducts transactions at the transaction terminal using the connected peripherals through interaction between the peripheral forwarding agent and the virtual transaction terminal with the transaction interface screens synchronized on the peripheral display by the remote desktop application.

In an embodiment, at 371, the remote desktop application synchronizes transaction states for the transactions with the connected peripherals and the virtual transaction terminal.

In an embodiment, at 380, the thin-client client OS wirelessly interacts with a mobile device. A mobile device display of the mobile device is the peripheral display of the transaction terminal and at least one HID of the mobile device is wirelessly connected as one of the connected peripherals to the transaction terminal.

In an embodiment, at 390, the peripheral forwarding agent forwards a new peripheral message for a dynamically connected peripheral to a guest OS of the virtual transaction terminal. This is a hot connect of a peripheral that is connected while the transaction terminal is already being operated as a thin client of the virtual transaction terminal.

Figure 4:
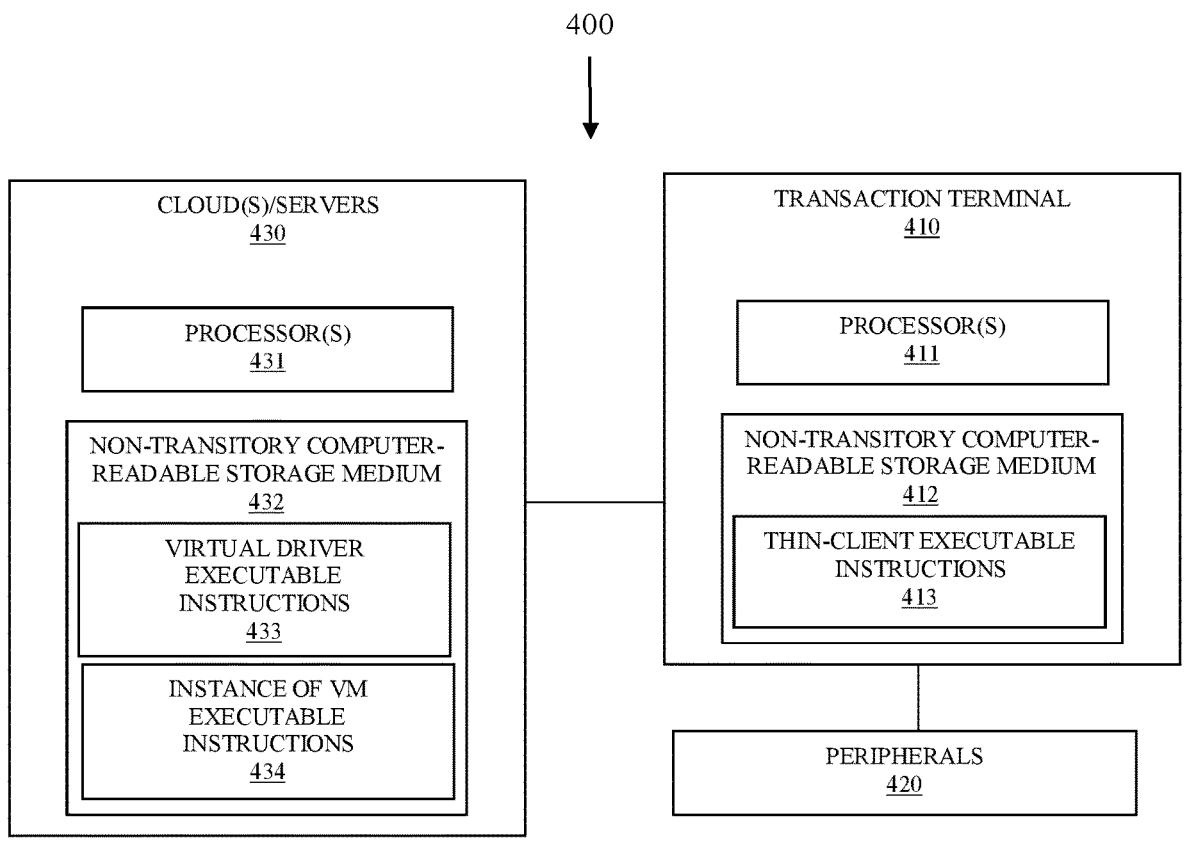
FIG. 4 is a diagram of another system for a virtualized transaction terminal platform, according to an example embodiment.

FIG. 4 is a diagram of a system 400 for another virtualized transaction terminal platform, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a transaction terminal 410 having at least one processor 411 and a non-transitory computer-readable storage medium 412 comprising thin-client executable instructions 413. The system 400 further includes a plurality of peripherals 420. Moreover, the system 400 includes one or more clouds or servers 430 having at least one processor 431 and a non-transitory computer-readable storage medium 432 comprising virtual driver executable instructions 433 and an instance of a VM set of executable instructions 434.

In an embodiment, the thin-client executable instructions 413 are all of or some combination of 111-114 and/or the method 300.

In an embodiment, the virtual driver executable instructions 433 and the VM set of executable instructions 434 are all of or some combination of 160, 170-174, and/or the method 200.

In an embodiment, peripherals 420 include any combination of peripherals that connect to thin-client terminal 410 using: USB, non-standard USB, PCI, GPIO, NFC, Bluetooth®, Wi-Fi, and Serial.

In an embodiment, a motherboard of transaction terminal 410 includes physical port connections for the peripherals 414.

In an embodiment, transaction terminal 410 is a POS terminal, a SST, a kiosk, an ATM, a mobile phone, a tablet, a laptop, or a wearable processing device.

The thin-client executable instructions 413 when executed by the transaction processor 411 from the transaction non-transitory computer-readable storage medium 412 cause the transaction processor 413 to perform processing comprising: 1) booting the transaction terminal 410 from a thin-client operating system (OS); 2) forwarding input commands that are produced by the virtual driver executable instructions 433 to the peripherals 420 as directed by the instance of the VM executable instructions 434; 3) providing output data generated by the peripherals 420 to the instance of the VM executable instructions 434; 4) displaying transaction interface screens generated by the instance of the VM executable instructions 434 on a display peripheral 420 associated with the transaction terminal 410; and 5) maintaining synchronized transaction states generated by the instance of the VM executable instructions 434 and the virtual driver executable instructions 433 with the peripherals 420 and the transaction interface screens displayed on the display peripheral 420.

The instance of the VM executable instructions 434 when executed by the cloud/server processor 431 from the cloud/server non-transitory computer-readable storage medium 432 causes the cloud/server processor 431 to perform processing comprising: 1) processing transactions initiated by information entered on input peripherals 420 of the transaction terminal 410; 2) using the virtual driver executable instructions 433 to produce the input commands that are forwarded to the thin-client executable instructions 413 for processing by the peripherals 420; 3) using the virtual driver executable instructions 433 to translate the output data generated by the peripherals 420 and provided by the thin-client executable instructions 413; and 4) generating the transaction states associated with the transaction interface screens and providing the transaction interface screens to the thin-client executable instructions 413 for displaying on the display peripheral 420.

The virtual driver executable instructions 433 when executed by the cloud/server processor 431 from the cloud/server non-transitory computer-readable storage medium 431 causes the cloud/server processor 431 to perform processing comprising: 1) generating the input commands that are to be processed by the peripherals 420 based on interaction with the instance of the VM executable instructions 434; and 2) translating output data provided by the peripherals 420 to the instance of the VM executable instructions 434 for processing by the instance of the VM executable instructions 434 with the transaction states.

In an embodiment, a mobile device (phone, tablet, laptop, or wearable processing device) is wirelessly connected to the transaction terminal 410 and provides the display peripheral 420 and one or more Human Input Devices (HIDs) as some HID peripherals 420 of transaction terminal 410.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving initialization messages trapped by a peripheral agent on a thin client device when a virtual transaction terminal instance is initiated remotely for the thin client device;
identifying types of peripherals connected to the thin client based on the initialization messages;
mapping each type of peripheral to a corresponding virtual peripheral device driver within the virtual transaction terminal instance;
processing the virtual transaction terminal instance remotely from the thin client device, forwarding first output received from the peripherals of the thin client device during the processing to the corresponding virtual peripheral device drivers during the processing, and forwarding second output received from the corresponding virtual peripheral device drivers to the peripherals during the processing.

2. The method of claim 1 further comprising synchronizing states of the virtual transaction terminal instance and transaction information for transactions being processed by the virtual transaction terminal instance with the virtual peripheral device drivers.

3. The method of claim 1 further comprising, processing the method in a cloud processing environment remotely located from the thin client device.

4. The method of claim 1, wherein receiving further includes loading and processing the virtual transaction terminal instance based on a request received during a startup or a boot of the thin client device.

5. The method of claim 1, wherein loading further includes receiving the initialization messages from the peripheral agent after a thin client Operating System (OS) is loaded on the thin client device during the startup or the boot.

6. The method of claim 1, wherein identifying further includes a version of a given type for a given peripheral from the corresponding initialization message.

7. The method of claim 1, wherein identifying further includes identifying at least one type from the corresponding initialization message as being wireless connection between the thin client device and a given peripheral.

8. The method of claim 7, wherein identifying further includes identifying the at least one type as a mobile device type associated mobile device being operated proximate to the thin client as the given peripheral.

9. The method of claim 7, wherein identifying further includes identifying a second type from the corresponding initialization message as being a wireless connection between the thin client device and a second peripheral, the second peripheral is a display wirelessly connected to the thin client device.

10. The method of claim 9, wherein identifying further includes identifying a third type from the corresponding initialization message as being a wireless connection between the thin client device and a third peripheral, the third peripheral is a scanner wirelessly connected to the thin client device.

11. The method of claim 10, wherein identifying further includes identifying a fourth type from the corresponding initialization message as being a wireless connection between the thin client device and a fourth peripheral, the fourth peripheral is a card reader wirelessly connected to the thin client device.

12. A method comprising:
sending a request for a virtual transaction terminal instance to be loaded and initiated within a cloud processing environment remotely from a thin client device during a startup or a boot of the thin client device;
trapping initialization messages sent by connected peripherals to the thin client device during the startup or the boot of the thin client device;
sending the initialization messages to the virtual transaction terminal instance;
forwarding first data received from virtual peripheral device drivers of the virtual transaction terminal instance to the corresponding connected peripherals when the thin client device is being operated for a transaction and the transaction is being processed within the virtual transaction terminal instance on the cloud processing environment; and
sending second data received from the connected peripherals to the corresponding virtual peripheral device drivers when the thin client device is being operated for the transaction and the transaction is being processed within the virtual transaction terminal instance on the cloud processing environment.

13. The method of claim 12, wherein forwarding the first data further includes sending a portion of the first data to a peripheral display connected to the thin client device, the portion of the first data representing transaction data for the transaction that is being processed within the virtual transaction terminal instance on the cloud processing environment.

14. The method of claim 12, wherein forwarding the first data further includes sending a portion of the first data to a peripheral media depository connected to the thin client device, the portion of the first data representing media dispense commands to dispense media from the peripheral media depository for the transaction that is being processed within the virtual transaction terminal instance on the cloud processing environment.

15. The method of claim 12, wherein forwarding the first data further includes wirelessly sending a portion of the first data to a wireless peripheral that is wirelessly connected to the thin client device.

16. The method of claim 12, wherein sending the second data further includes wirelessly sending the second data to the corresponding virtual peripheral device drivers over a wireless connection between the thin client device and the cloud processing environment.

17. The method of claim 12 further comprising:
detecting a new initialization message received from a new peripheral connected to the thin client device during processing of a second transaction by the virtual transaction terminal instance from the cloud processing environment;
sending the new initialization message to the virtual transaction terminal instance for the virtual transaction terminal instance to link a new virtual peripheral device driver for the new peripheral within the virtual peripheral device drivers;
processing the forwarding of the first data for the second transaction; and
processing the sending of the second data for the second transaction.

18. The method of claim 12 further comprising:
operating the thin client device as a Self-Service Terminal (SST) for a self-service transaction that is the transaction, wherein the virtual transaction terminal instance is an SST instance;
operating the thin client device as a Point-Of-Sale (POS) terminal for a cashier-assisted transaction that is the transaction, wherein the virtual transaction terminal instance is a POS terminal instance; or
operating the thin client device as an Automated Teller Machine (ATM) for a financial transaction that is the transaction, wherein the virtual transaction terminal instance is an ATM instance.

19. A system, comprising:
a thin client device comprising connected peripheral devices and a processor to execute a thin client Operating System (OS) and process a peripheral agent within the thin client OS; and
a cloud processing environment comprising at least one server and at least one processor to manage and to process transactions initiated on the thin client device that use the connected peripheral devices within a virtual transaction terminal instance;
wherein the peripheral agent is configured to cause the processor to:
identify the connected peripherals connected to the thin client device;
report types of the connected peripheral devices to the virtual transaction terminal instance;
forward first data received from virtual peripheral device drivers of the virtual transaction terminal instance to the corresponding connected peripherals devices connected to the thin client device during the transactions; and
send second data received from the connected peripheral devices to the corresponding virtual peripheral device drivers of the virtual transaction terminal instance during the transactions;

wherein the virtual transaction terminal instance is configured to cause the at least one processor of the cloud processing environment to:
map the types for the connected peripherals to the corresponding virtual peripheral device drivers;
provide the first data to the corresponding virtual device drivers during the transactions; and
send the second data to the corresponding virtual device drivers during the transactions.

20. The system of claim 19, wherein the connected peripherals comprise one or more of: a touch display, a wirelessly connected touch display, a card reader, a wireless connected card reader, a bar code scanner, a wirelessly connected bar code scanner, a media depository, a wireless connected media depository, a camera, and a wirelessly connected camera, a cash drawer, a wireless connected cash drawer, an encrypted Personal Identification Number (PIN) pad, a wirelessly connected encrypted PIN pad.

* * * * *